United States Patent
Maezawa et al.

(10) Patent No.: US 7,202,485 B2
(45) Date of Patent: Apr. 10, 2007

(54) RADIATION IMAGE CONVERSION PANEL AND PREPARATION METHOD THEREOF

(75) Inventors: Akihiro Maezawa, Hino (JP); Kouji Miyawaki, Hino (JP); Noriyuki Mishina, Ome (JP)

(73) Assignee: Konica Minolta Medical & Graphic, Inc. (JP)

( * ) Notice: Subject to any disclaimer, the term of this patent is extended or adjusted under 35 U.S.C. 154(b) by 77 days.

(21) Appl. No.: 10/985,769

(22) Filed: Nov. 11, 2004

(65) Prior Publication Data

US 2005/0104009 A1 May 19, 2005

(30) Foreign Application Priority Data

| Nov. 18, 2003 | (JP) | ............................. 2003-387603 |
| Nov. 19, 2003 | (JP) | ............................. 2003-388901 |
| Sep. 3, 2004 | (JP) | ............................. 2004-256733 |

(51) Int. Cl.
*B05D 5/06* (2006.01)
*B05D 5/12* (2006.01)
*G03B 42/08* (2006.01)
*G01N 23/04* (2006.01)

(52) U.S. Cl. ..................... 250/484.4; 250/582; 427/65

(58) Field of Classification Search ..................... None
See application file for complete search history.

(56) References Cited

U.S. PATENT DOCUMENTS

| 3,859,527 | A |   | 1/1975 | Luckey | |
| 4,963,751 | A | * | 10/1990 | Kano et al. | ............... 250/484.4 |
| 5,880,476 | A | * | 3/1999 | Suzuki | ..................... 250/484.4 |
| 6,075,250 | A | * | 6/2000 | Fukui et al. | .............. 250/484.4 |
| 6,476,406 | B1 | * | 11/2002 | Struye et al. | ................ 250/585 |
| 6,478,412 | B1 | * | 11/2002 | Hanabata | ..................... 347/71 |
| 2003/0183777 | A1 | * | 10/2003 | Struye et al. | ............. 250/484.4 |
| 2003/0209675 | A1 | * | 11/2003 | Maezawa et al. | ......... 250/484.4 |
| 2004/0018384 | A1 | * | 1/2004 | Hirose et al. | ............... 428/690 |
| 2004/0149929 | A1 | * | 8/2004 | Miyake | ................... 250/484.4 |

FOREIGN PATENT DOCUMENTS

| JP | 59-75200 | | 4/1984 |
| JP | 61-72087 | | 4/1986 |
| JP | 61-73786 | | 4/1986 |
| JP | 61-73787 | | 4/1986 |
| JP | 61-142497 | | 6/1986 |
| JP | 62-039737 | | 2/1987 |
| JP | 2-58000 | | 2/1990 |
| JP | 10188662 | A * | 7/1998 |

OTHER PUBLICATIONS

Hutchings et al., "Apparatus for Chemical Vapor Deposition of Polyimide Films," Review of Scientific Instruments, vol. 66, No. 7 (Jul. 1995), pp. 3943-3947.*

* cited by examiner

*Primary Examiner*—David Porta
*Assistant Examiner*—Frederick F. Rosenberger
(74) *Attorney, Agent, or Firm*—Cantor Colburn LLP

(57) ABSTRACT

A radiation image conversion panel exhibiting enhanced luminance and superior sharpness is disclosed, comprising on a support a stimulable phosphor layer, wherein the stimulable phosphor layer which has been formed by gas phase deposition has a thickness of 50 μm to 1 mm, and a protective layer composed of a thermosetting resin or a thermoplastic resin is further provided on the stimulable phosphor layer.

7 Claims, 1 Drawing Sheet

RADIATION IMAGE CONVERSION PANEL AND PREPARATION METHOD THEREOF

FIELD OF THE INVENTION

The present invention relates to a radiation image conversion panel and a method of preparing the radiation image conversion panel (hereinafter, also denoted simply as a preparation method).

BACKGROUND OF THE INVENTION

Although so-called radiography employing silver halide photography is conventionally used to obtain radiographic images, there also has been developed a radiographic imaging method not using silver halide photographic material. Thus, an imaging method is disclosed, in which radiation that has been transmitted through an object is absorbed by phosphor, followed by exciting the phosphor with an energy to cause a radiation energy accumulated in the phosphor to radiate in the form of fluorescence, and imaging is achieved by detecting the fluorescence.

Specifically, U.S. Pat. No. 3,859,527 discloses a radiation image conversion method, in which a panel comprising on a support a photostimulable phosphor layer is employed using either or both visible light and infrared rays as the stimulating energy. There have been developed radiation image conversion methods using a photostimulable phosphor(hereinafter, also denoted simply as a stimulable phosphor) exhibiting enhanced luminance and high sensitivity, including, for example, a radiation image conversion method employing $BaFX:Eu^{2+}$ type phosphor (X:Cl, Br, I), as described in JP-A No. 59-75200 (hereinafter, the term, JP-A refers to Japanese Patent Application Publication); a radiation image conversion method employing an alkali halide phosphor, as described in JP-A No. 61-72087; a radiation image conversion method employing an alkali halide phosphor containing, as co-activators, $Tl^+$ and metals such as $Ce^{3+}$, $Sm^{3+}$, $Eu^{3+}$, $Y^{3+}$, $Ag^+$, $Mg^{2+}$, $Pb^{2+}$ or $In^{3+}$, as described in JP-A Nos. 61-73786 and 61-73787.

Recently, a radiation image conversion panel exhibiting further enhanced sharpness has been desired in the field of diagnostic image analysis. Of these, an attempt in controlling the form of stimulable phosphor grains to enhance sensitivity and sharpness was made as a means for improving sharpness of radiographic images. For example, JP-A No. 61-142497 discloses a method-of using a stimulable phosphor layer comprising a fine columnar block which has been formed by sedimentation of a stimulable phosphor on a support having fine protruded patterns; JP-A 62-39737 discloses-a method of using a radiation image conversion panel having a stimulable phosphor layer having a pseudo-columnar form which has been formed by producing cracks on the layer surface side; JP-A 62-110200 proposes a method in which a stimulable phosphor layer having voids is formed by vapor deposition onto the upper surface of a support, followed by growing voids by subjecting a heating treatment to produce cracks.

JP-A No. 2-58000 proposed a radiation image conversion panel having a stimulable phosphor layer, in which long and thin columnar crystals were formed with an incline at a given angle toward the direction normal to the support.

In the foregoing attempts to control the form of a stimulable phosphor layer, it was intended to enhance image quality by allowing the phosphor layer to have a columnar crystal structure. It was supposed that the columnar form prevented traverse diffusion of stimulated emission light (or photo-stimulated luminescence), i.e., the light reached the support surface with repeating reflection at the interface of cracks (or columnar crystals), thereby leading to markedly enhanced sharpness of images formed by the stimulated luminescence.

Recently, a radiation image conversion panel using a stimulable phosphor containing an alkali halide such as CsBr as a basic substance and Eu as an activator, and the use of activator Eu leading to enhanced X-ray conversion efficiency, which has formerly not been achieved. However, Eu exhibits a marked thermal diffusion and also exhibits relatively high vapor pressure under vacuum, producing problems that Eu often scatters or localizes in parent material, thereby making it difficult to achieve an intended high X-ray conversion efficiency, so that practical use has not been accomplished on the market.

However, it has been desired to form a phosphor layer of CsBr:Eu through vapor deposition system. In the formation of a deposit layer, a substrate and an evaporation source is precisely arranged to control the distribution of layer thickness and the physical position is designed to perform the precise layer thickness distribution. Specifically in CsBr:Eu, thermal diffusion of Eu is marked and the vapor pressure under vacuum is relatively high and scattering results in local existence of Eu in parent material, therefore, a deposition process and substrate material quality become important to achieve layer uniformity. Specifically, uniformity in close contact of a phosphor layer with the substrate is essential to realize enhanced performance as well as a large area and high thickness. When resin is placed on the substrate surface, remained solvent or volatile gradients resulting from the manufacturing process of the resin are present in a relatively large amount, producing volatile components during the phosphor layer formation, changing the degree of vacuum and resulting in variation in layer thickness.

SUMMARY OF THE INVENTION

Accordingly, it is an object of the present invention to provide a radiation image conversion panel exhibiting superior homogeneity of an activator in a phosphor layer and enhanced luminance and sharpness, and a preparation method of the same. Thus, in one aspect the present invention is directed to a radiation image conversion panel comprising on a support a stimulable phosphor layer, wherein the stimulable phosphor layer which has been formed by gas phase deposition has a thickness of 50 μm to 1 mm, and the radiation image conversion panel further comprises a protective layer composed of a thermosetting resin or a thermoplastic resin and provided on the stimulable phosphor layer. In another aspect the invention is directed to a preparation method of the radiation image conversion panel by the process of gas phase deposition.

DETAILED DESCRIPTION OF THE INVENTION

Figure 1:
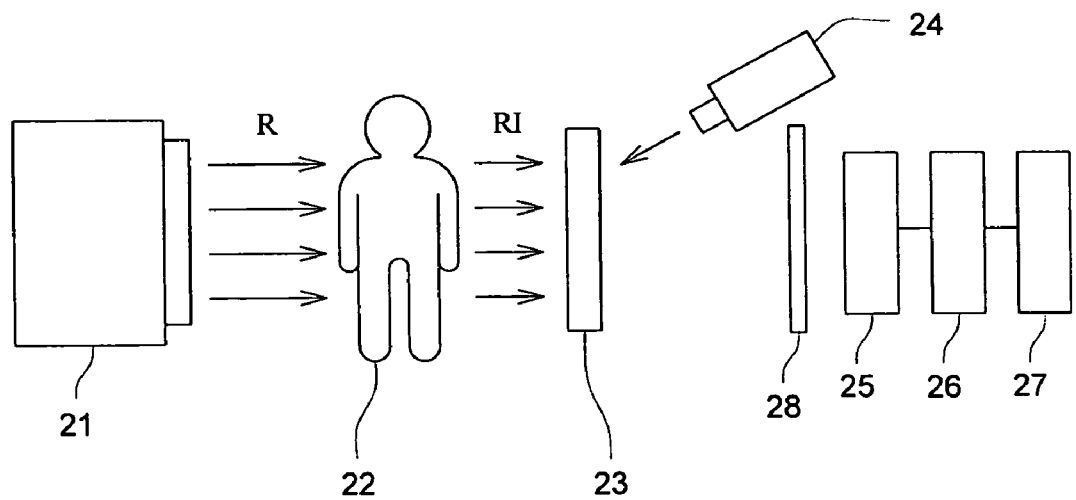
FIG. 1 shows an example of obtaining a transmission-type radiation image using a radiation image conversion panel according to the invention.

In this invention, a protective layer provided on a stimulable phosphor layer is comprised of a thermosetting resin or a thermoplastic resin.

The protective layer may be formed by coating a coating solution for the protective layer on the stimulable phosphor layer, or a previously formed protective layer may be adhered onto a stimulable phosphor layer or a stimulable phosphor layer may be formed on the previously formed protective layer. In one embodiment of this invention, a protective layer comprising a thermosetting resin or thermoplastic resin is provided on the stimulable phosphor layer by the process of vapor deposition or sputtering. The protective layer preferably has a thickness of from 0.1 to 2000 µm (more preferably 1 to 20 µm). The heating temperature in the process of forming a protective layer through vapor deposition or sputtering is preferably from 100 to 300° C. The degree of vacuum in the process of forming a protective layer through vapor deposition or sputtering is substantially the same as that of the process of forming a stimulable phosphor layer through vapor deposition or sputtering, as described later.

A thermosetting resin is a synthetic resin which hardens or solidifies when heated. Specific examples of a thermosetting resin include a polyurea resin (including a urea resin), silicone resin, epoxy resin and acryl resin. Of the thermosetting resins, a polyurea resin is preferred in this invention.

Monomers may be used alone or in combination. A thermosetting resin having a main chain of isobutylene may be copolymerized with olefinic monomers such as ethylene, propylene, butadiene, isoprene, styrene, or acrylic acid ester.

A thermoplastic resin is a resin which repeatedly softens when heated and hardens when cooled. Specific examples of a thermoplastic resin include a polycarbonate, polyacrylonitrile, polystyrene, acrylic acid ester copolymer, polyvinyl alcohol, polymethacrylic acid, copolymer of vinyl chloride and vinyl acetate, polyethylene, copolymer of ethylene and ethyl acetate, polyvinyl chloride, polyvinylidene chloride, polyvinyl acetate, polyester, polyamide, polyether, silicone, polybutadiene, styrene-butadine copolymer, ABS rubber, copolymer of acrylonitrile and butadiene, polyurethane, silicone-acryl copolymer, acryl-modified fluororesin, and polyimide resin. There are also included random copolymers, block copolymers and raft copolymers of the foregoing polymeric compounds. Of these thermoplastic resins, a polyimide resin is preferred.

A thermoplastic resin preferably is one which is optimally cross-linked or cured. Various methods known in the art are applicable to prepare a thermoplastic resin. When styrene or acrylic acid ester is subjected to radical polymerization to obtain a polymeric compound, for example, bifunctional or polyfunctional cross-linking agents such as divinylbenzene, trimethanolpropanetriacrylate, or 1,6-hexanediol diacrylate are added in an optimum amount, followed by performing polymerixzation. In the case of condensation polymers such as polyester or polyurethane, polycondensation is performed in the presence of tri- or more-functional alcohols such as trimethylolpropane or tri- or more-functional isocyanates.

A thermoplastic resin usable in this invention desirably is one which exhibits relative low reflectance and is capable of allowing stimulated emission to transmit, and having constitution or material capable of preventing taking-out adhesion of deposited crystals.

In one preferred embodiment of this invention, a protective layer of a polyurea (urea resin) is formed through vapor deposition using a polyamine and a polyisocyanate. A polyurea is a reaction product of a polyamine and a polyisocyanate. Thus, using a polyamine and a polyisocyanate as an evaporation source, they are allowed to deposit on the phosphor layer, causing a chemical reaction to form a polyurea layer on the phosphor layer.

Various kinds of polyisocyanates for use in polyurethane resin, polyurethane paints, and polyurethane adhesives are usable as a polyisocyanate used for polyurea formation. Such polyisocyanates include, for example, toluenediisocyanate, (TDI), diphenylmethanediisocyanate (MDI), 1,6-hexamethylenediisocyanate, 2,2,4 (or 2,4,4)-trimethylhexamethylenediisocyanate, p-phenylenediisocyanate, 4,4-dicyclohexylmethanediisocyanate, 3,3'-dimetyldiphenyl-4, 4'-diisocyanate, dianisidine-diisocyanate, m-xylenediisocyanate, 1,3-bis(isocyanatomethyl)cyclohexane, tetramethylxylene-diisocyanate, isophorone-diisocyanate, 1,5-naphthanenediisocyanate, 1,4-cyclohexyldiisocyanate, lysinediisocyanate, dimethyltriphenylmethanetetraisocyanate, triphenylmethanetriisocyanate, tris(isocyanatophenyl)thiophosphate, urethane-modified toluenediisocyanate, allophanate-modified toluenediisocyanate, biuret-modified toluenediisocyanate, isocyanurate-modified toluenediisocyanate, urethane-modified diphenylmethanediisocyanate, carbodiimide-modified diphenylmethanediisocyanate, urethonimine-modified diphenylmethanediisocyanate, acylurea-modified diphenylmethanediisocyanate, and polymeric diphenylmethanediisocyanate, but are not limited to the foregoing.

These isocyanate compounds may be used as a single item or in the form of a reaction product of plural kinds of polyisocyanates, a reaction product of an ethyleneoxide adduct with methanol or ethanol and a polyisocyanate, or a compound having a free isocyanate group, obtained by a reaction of a compound containing at least two active hydrogen within the molecule and a polyisocyanate.

Polyamines used for polyurethane formation include, for example, low-molecular weight or high-molecular weight polyamines, such as ethylenediamine, propylenediamine, triethylenediamine, tripropylenediamine, polyethylenepolyamine, polyethyleneimine, and polypolyacrylamide.

Polyisocyanates and polyamines are preferably those having 5 to 30 carbon atoms, and more preferably 7 to 15 carbon atoms in terms of control of vapor deposition.

Unreacted polyisocyanate remained in the polyurea protective layer often reacts with water to become yellow, and it is therefore preferable that a deposition amount of a polyamine is more than that of polyisocyanate. The temperature of a substrate (support) having a stimulable phosphor layer is controlled to adjust the component ratio of a polyisocyanate to polyamine. When vaporized polyamine and polyisocyanate are deposited onto the phosphor layer on the substrate maintained at a specific temperature or more, they differ in vapor pressure characteristics (for example, vaporization, adsorption and desorption properties) and exhibit different times for adsorption and retention. Polyamine exhibits a higher vapor pressure than polyisocyanate so that the component ratio can be varied by controlling the substrate temperature. It is preferred to perform deposition while maintaining the substrate at a temperature of 50° C. or more.

Alternatively, a polyamine and a polyisocyanate are separately put into evaporation source crucibles, in which the heating temperatures are individually controlled, and evaporation is separately performed, thereby controlling the component ratio. However, it is preferred that a polyamine and a polyisocyanate are put into a single evaporation source crucible to perform vapor deposition.

A thermosetting resin or thermoplastic resin usable in this invention desirably is one which exhibits relative low reflectance and is capable of allowing stimulated emission to transmit, and having constitution or material capable of preventing taking-out adhesion of deposited crystals.

The foregoing resin deposits onto the top portion of columnar crystals of a stimulable phosphor to form a protective layer. The resin does not deposit into the spacing between columnar crystals so that light-guide effect of the columnar crystals can be achieved under the total reflection condition, resulting in enhanced sharpness. Deposition of a resin into the spacing between columnar crystals causes optical continuity between columnar crystals via the resin, resulting in lowered sharpness.

The stimulable phosphor layer can be formed by the process of vapor deposition of a stimulable phosphor layer, for example, CsBr:eEu. Further, it is essential that the stimulable phosphor of this invention form columnar crystals as a crystal exhibiting superior sharpness. Specifically, to achieve superior light-guide effects, it is desirable to form columnar crystals having a top with a diameter of 2 to 8 μm. It was also proved that when formed under vacuum in a vapor deposition chamber and then exposed to atmospheric air, the surface of the phosphor layer absorbs moisture, resulting in lowered performance. Thus, influences of adsorption due to the capillary phenomenon emerges when the top of the columnar crystal is thinned to enhance performance. As a result of extensive study, it was proved that formation of a protective layer to prevent adsorption through continuous layer formation was effective to inhibit such influences.

A stimulable phosphor usable in this invention preferably is a compound represented by the following formula (1):

$$M^1X \cdot aM^2X' \cdot bM^3X''_3 : eA \quad \text{formula (1)}$$

In the foregoing formula (1), $M^1$ is at least one alkali metal atom selected from the group consisting of Li, Na, K, Rb and Cs, preferably at least one alkali metal atom selected from Rb and Cs atoms, and more preferably Cs atom.

$M^2$ represents a divalent metal selected from the group consisting of Be, Mg, Ca, Sr, Ba, Zn, Cd, Cu and Ni. Of these, a divalent metal selected from the group consisting of Be, Mg, Ca, Sr, and Ba is preferred.

$M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga. Of these, a trivalent metal selected from the group consisting of Y, Ce, Sm, Eu, Al, Gd, Lu, Ga and In is preferred.

A represents a metal selected from the group consisting of Eu, Tb, In, Ce, Tm, Dy, Pr, Ho, Nd, Yb, Er, Gd, Lu, Sm, Y, Tl, Na, Ag, Cu and Mg.

X, X' and X'' are each at least one halogen atom selected from the group consisting of F, Cl, Br and I, preferably at least one halogen atom selected from F, Cl and Br, and more preferably at least one halogen atom selected from Br and I in terms of enhancing stimulated emission of a stimulable phosphor.

The stimulable phosphor represented by the foregoing formula (1) can be prepared, for example, in the following manner.

First, an acid (HI, HBr, HCl or HF) is added to a carbonate so as to form a composition of a phosphor raw material described below and after mixed with stirring, the mixture is filtered at a point of neutralization, and the filtrate was evaporated to obtain crystals having the following composition.

As phosphor raw material, at least one compound selected from each of the following groups (a) and (b), and a compound containing a metal atom selected from the following group (c) are used:

(a) NaF, NaCl, NaBr, NaI, KF, KCl, KBr, KI, RbF, RBCl, RbBr, RbI, CsF, CsCl, CsBr, and CsI;

(b) $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$;

(c) Eu, Tb, In, Cs, Ce, Tm, Dy, Pr, Ho, Nd, Yb, Er, Gd, Lu, Sm, Y, Tl, Na, Ag, Cu and Mg.

In the formula (1), "a" is $0 \leq a < 0.5$ and preferably $0 \leq a < 0.01$; "b" is $0 \leq b < 0.5$, and preferably $0 \leq b \leq 0.01$; "e" is $0 < e \leq 0.2$, and preferably $0 < e \leq 0.1$.

Phosphor raw materials, which have been selected from the foregoing (a) to (c) so as to have mixing composition meeting the numerical range, as defined in this invention are weighed and dissolved in pure water. In this regard, there may be conducted sufficient mixing using a mortar, ball mill or mixer mill. Next, a prescribed amount of an acid is added to adjust a pH value (C) of the thus obtained solution so as to fall within the range of $0 < C < 7$, and then any water is vaporized.

Further, the obtained raw material mixture is charged into a heat-resistant vessel such as a silica port, an alumina crucible or a silica crucible and then placed in an electric furnace to be calcined. The calcination temperature preferably is 500 to 1000° C. The calcination time, depending on a charging amount of raw materials, calcination temperature and the like, preferably is 0.5 to 6 hrs. As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the phosphor. When the calcined material is allowed to cool from calcination temperature to room temperature, the intended phosphor can be obtained by being taken out the calcined material from an electric furnace and allowing it to stand in an aerial atmosphere. In this regard, the calcined material may be cooled in the same atmosphere as in the calcination, such as a weakly reducing atmosphere or neutral atmosphere. Alternatively, the calcined material is moved from a heating section to a cooling section within the electric furnace, followed by being rapidly cooled in a weakly reducing atmosphere, neutral atmosphere or weakly oxidizing atmosphere, thereby leading to further enhanced stimulated emission luminance of the phosphor.

Of stimulable phosphors of the foregoing formula (1), a stimulable phosphor represented by the following formula (2) is more preferred:

$$M^1X:eA \quad \text{formula (2)}$$

wherein $M^1$, X, e and A are the same as defined in the foregoing formula (1). Of these stimulable phosphors of the formula (2), a stimulable phosphor represented by the formula of CsBr:eEu is specifically preferred.

The stimulable phosphor layer is formed by a vapor-phase growth process. A vacuum evaporation method, a sputter deposition method, a CVD method, ion plating method and other methods have been employed to allow the stimulable phosphor to undergo vapor-phase growth.

The foregoing methods are conducted in the manner described below.

Vacuum evaporation is conducted in such a manner that after placing a support in an evaporation apparatus, the inside of the apparatus is evacuated to a vacuum degree of $1.333 \times 10^{-4}$ Pa and subsequently, at least a stimulable phosphor is evaporated with heating by the resistance heating method or electron-beam method to cause the phosphor to be deposited in the form of columnar crystals on the surface of the support to grow the columnar crystals to form a stimulable phosphor layer with a desired thickness. As a result, a stimulable phosphor layer containing no binder is formed, provided that the foregoing evaporation stage may be divided into plural times to form the stimulable phosphor layer. In this evaporation stage, plural resistance heaters or electron beams may be used to perform vacuum evaporation. Alternatively, raw material of a stimulable phosphor is evaporated using plural resistance heaters or electron beams and the intended stimulable phosphor is synthesized on the support, simultaneously forming a stimulable phosphor layer. After completion of vapor evaporation, a radiation image conversion panel of this invention can be prepared by optionally providing a protective layer on the opposite side of the stimulable phosphor layer to the support. Vacuum evaporation may be conducted while cooling or heating the substrate to be deposited thereon. After completion of vacuum evaporation, the stimulable phosphor layer may be subjected to a heating treatment. In vapor evaporation, a gas such as $O_2$ or $H_2$ may optionally be introduced to perform reactive vapor evaporation.

Sputter deposition is conducted in such a manner that after setting a support in a sputtering apparatus, the inside of the apparatus is evacuated to a vacuum level of $1.333 \times 10^{-4}$ Pa and then inert gas used for sputtering such as Ar and Ne is introduced therein at a gas pressure of ca. $1.333 \times 10^{-1}$ Pa, subsequently, sputtering is carried out with targetting the stimulable phosphor to cause the phosphor to be deposited on the slanted surface of the support so as to have a desired thickness. Similarly to the vacuum evaporation, various treatments may be applied.

Further, there are also applicable the CVD method and ion plating method.

The growth rate of a stimulable phosphor layer in the vapor-phase growth preferably is 0.05 to 300 μm/min. A growth rate of less than 0.05 μm/min results in lowered productivity of the radiation image conversion panel of this invention and is not preferable. In the case of a growth rate of more than 300 μm/min, it is difficult to control the growth rate and is not unsuitable.

A radiation image conversion panel which has been prepared by the vapor evaporation method or sputter deposition method contains no binder, leading to increased filling density of the stimulable phosphor layer and thereby a radiation image conversion panel with enhanced sensitivity and sharpness can be obtained.

A thickness of the stimulable phosphor layer, depending on the intended use of the radiation image conversion panel and the kind of stimulable phosphor, preferably is 50 μm to 1 mm, more preferably 50 to 300 μm, still more preferably 100 to 300 μm, and optimally 150 to 300 μm.

In the formation of a stimulable phosphor layer by the vapor-phase growth process, a support on which the stimulable phosphor layer is to be formed, is preferably heated at a temperature of 100° C. or higher, more preferably 150° C. or higher, and still more preferably 150 to 400° C.

The reflectance of a stimulable phosphor layer preferably is not less than 20%, more preferably not less than 30%, and still-more preferably not less than 40%, with an upper limit of 100%.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering the phosphor layer, in addition to the foregoing strengthening effect. Material exhibiting high reflectance refers to one exhibiting a high reflectance with respect to stimulating light (500 to 900 nm, specifically 600 to 800 nm), including metals such as aluminum, magnesium, silver and indium, white pigments and colorants ranging green to red.

White pigments can also reflect stimulating light. Examples thereof include $TiO_2$ (anatase type, rutile type), MgO, $PbCO_3$, $Pb(OH)_2$, $BaSO_4$, $Al_2O_3$, M(II)FX [in which M(II) is at least one of Ba, Sr and Ca, X is at least one of Cl and Br], $CaCO_3$, ZnO, $Sb_2O_3$, $SiO_2$, $ZrO_2$, lithopone ($BaSO_4 \cdot ZnS$), magnesium silicate, basic lead silisulfate, and aluminum silicate. These white pigments exhibit high covering power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and blue colorants. Of these, carbon absorbs stimulated luminescence.

Colorants may be any organic or inorganic colorants. Examples of organic colorants include Zapon Fastblue 3G (produced by Hoechst A. G.), Estrol Brillblue N-3RL (produced by Sumitomo Chemical Ind. Co.Ltd.), D6CBlue No. 1 (produced by National Aniline Co.), Spirit Blue (produced by HODOGAYA KAGAKU Co., Ltd.), Oilblue No. 603 (produced by Orient Co., Ltd.), Kiton Blue A (produced by Chiba Geigy Co.), Aisen Cationblue GLH (produced by HODOGAYA KAGAKU Co., Ltd.), Lakeblue AFH (produced by KYOWA SANGYO Co., Ltd.), Primocyanine 6GX (produced by INAHATA SANGYO o. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.). There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460. Examples of inorganic colorants include ultramarine, cobalt blue, celureun blue, chromium oxide, and $TiO_2$—ZnO—NiO type pigments.

FIG. 1 illustrates a constitution of a radiation image conversion panel of this invention. In FIG. 1, the numeral 21 designates a radiation generating apparatus, 22 designates an object, 23 designates a radiation image conversion panel having a visible- or infrared-stimulable phosphor layer, 24 designates a stimulating light source to cause a latent image stored in the radiation image conversion panel (23) to be emitted as stimulated luminescence, 25 designates a photo-electric conversion apparatus to detect the stimulated luminescence emitted from the radiation image conversion panel (23), 26 designates an image reproduction apparatus to reproduce photoelectric conversion signals detected in the photoelectric conversion apparatus (25) in the form of an image, 27 designates a display apparatus to display reproduced images, and 28 designates a filter for reflected light from a light source (24) to allow only light emitted from the radiation image conversion panel (23) to pass therethrough. FIG. 1 shows an example of obtaining a transmission-type radiation image, and in cases where the object (22) itself radiates radiation, a radiation generation apparatus (21) may not be required. An apparatus subsequent to the photoelectric conversion (25) apparatus may be any one that is capable of reproducing light information from the radiation image conversion panel (23), in any image form.

As shown in FIG. 1, when the object (22) is arranged between the radiation generation apparatus (21) and the radiation image conversion panel (23), and exposed to radiation (R), the radiation (R) transmits the respective portions of the object (22) in accordance with radiation transmittance thereof and the resulting transmission image (RI), i.e., an image having different radiation intensities enters the radiation image conversion panel (23). The thus entered transmission image (RI) is absorbed in a stimulable phosphor layer of the radiation image conversion panel (23), in which electrons and/or holes are generated in proportion to the dose of the absorbed radiation and accumulated at a trap level of the stimulable phosphor to form a latent image accumulating energies of the radiation transmission image. Subsequently, the latent image is excited with light energy to form an actual image, i.e., the stimulated phosphor layer is irradiated with the light source (24) irradiating visible or infrared light to eject the electrons and/or holes accumulated on the trap level to emit the accumulated energy in the form of stimulated luminescence. The intensity of the emitted luminescence is proportional to the number of accumulated electrons and/or holes, that is, energy of the radiation absorbed in the stimulable phosphor of the radiation image conversion panel (23). The thus obtained light signals are converted to electric signals by the photoelectric conversion (25) apparatus such as a photomultiplier, which are reproduced as an image in image processor (26), displaying the image in image display apparatus (27). As the image processor (26), it is effective to employ one which not only reproduces the electric signals as the image signal but one which can also conduct image processing, computation, memory and storage of the image.

The stimulated luminescence emitted from the stimulable phosphor layer, having a spectral distribution in the lower wavelength region is preferable, based on the reason that the stimulated luminescence emitted from the stimulable phosphor layer is required to be separated from the reflected stimulating light and photoelectric converters to receive the luminescence emitted from the stimulable phosphor layer, in general, are provided with a sensor having higher sensitivity to light energy of 600 nm or less. Emission of stimulable phosphors relating to the invention falls within the wavelength region of 300 to 500 nm and the stimulating light wavelength is 500 to 900 nm, satisfying the foregoing conditions. Further, along with a recent trend of down-sizing diagnostic apparatuses, semiconductor lasers which exhibit a higher output and are capable of being further down-sized are preferably employed for use in reading images of the radiation image conversion panel. The semiconductor laser has a wavelength of 680 nm and the stimulable phosphor used in the radiation image conversion panel of the invention exhibits extremely superior sharpness when using a stimulating light of 680 nm. Thus, the stimulable phosphors relating to the invention emit luminescence having a main peak at 500 nm or less, which is easily separable from the stimulating light and compatible with spectral sensitivity of the receiver, leading to enhanced light-receiving efficiency and enhanced sensitivity of an image receiving system.

Light sources including the stimulating wavelength for the stimulable phosphor used in the radiation image conversion panel (23) are used as the stimulating light source (24). Specifically, the use of laser light simplifies an optical system and leads to enhanced stimulating light intensity, resulting in preferable performance. Examples of the laser include an He—Ne laser, He—Cd laser,.Ar ion laser, Kr laser, $N_2$ laser, YAG laser and its second harmonic wave, ruby laser, semiconductor laser, various dye lasers, and metal vapor lasers such as a copper vapor laser. Of these, continuous oscillation lasers such as an He—Ne laser and an Ar ion laser are usually desirable, and pulse-oscillated lasers are also usable by synchronizing the pulse with a scanning time for one pixel of the panel. In cases when employing retarded emission for separation, instead of using the filter (28), the use of the pulse-oscillated laser is preferable rather than modulation of the continuous oscillation laser, as described in JP-A No. 59-22046. Of the various laser light sources described above, semiconductor lasers are specifically preferred in terms of being compact, inexpensive and not requiring a modulator.

The filter (28) cuts reflected stimulating light and allows the stimulated luminescence emitted from the radiation image conversion panel (23) to transmit, which is determined by the combination of the stimulated emission wavelength of a stimulable phosphor contained in the radiation image conversion panel (23) and the stimulating light source (24). In the preferred practical combination of a stimulating light wavelength of 500 to 900 nm with a stimulated emission wavelength of 300 to 500 nm, for example, violet to blue glass filters are used, such as C-39, C-40, V-40, V-42 and V-44 (available from TOSHIBA CORP.), 7-54 and 7-59 (available from Corning Co.), BG-1, BG-3, BG-25, BG-37 and BG-38 (available from Spectrofilm Co.). Interference filters are usable by selecting specific filters. The photoelectric conversion apparatus (25) usable in the invention includes any one capable of converting variation of luminous energy to electric signal, such as a photoelectric tube, a photomultiplier, a photodiode, a phototransistor, a solar cell, and photoconductive elements.

EXAMPLES

The present invention will be further described based on examples but embodiments of the invention is by no means limited to these examples.

Example 1

Preparation of Radiation Image Conversion Panel Sample

Figure 2:
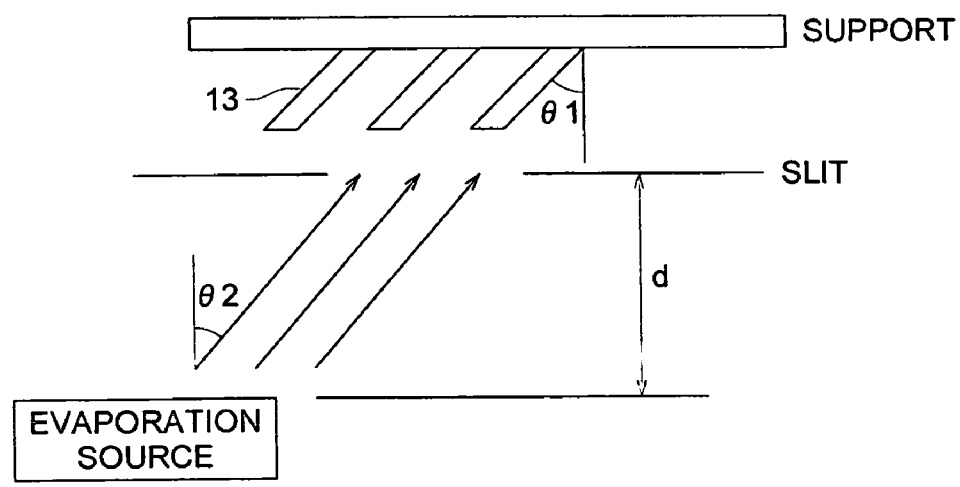
FIG. 2 illustrates formation of a stimulable phosphor layer by vapor deposition.

On the surface of a 1 mm thick crystallized glass support (produced by Nippon Denki Glass Co., Ltd.) was formed a stimulable phosphor layer containing stimulable phosphor (CsBr:Eu) according to the condition shown in Table 1, using a vacuum evaporation apparatus as shown in FIG. 2 (in which $\theta_1=5°$ and $\theta_2=5°$ were respectively set). In the vacuum evaporation apparatus as shown in FIG. 2, the phosphor was introduced using an aluminum slit at a distance (d) of 60 cm between a slit and a evaporation source with transporting the support in the parallel direction to form a 300 μm thick stimulable phosphor layer comprising columnar crystals (13).

In the vacuum evaporation, the support was set in the evaporation chamber of an evaporator and then, phosphor raw material, as an evaporation source (CsBr:Eu) which was previously molded in a press was put into a water-cooled crucible. Thereafter, the inside of the evaporator was evacuated and after introducing $N_2$ gas to adjust the vacuum to a pressure of 0.133 Pa, vacuum evaporation was conducted to perform vapor deposition, while maintaining the support temperature (also called substrate temperature) at 350° C. The vapor deposition was completed when the thickness of the stimulable phosphor layer reached 300 μm and then, the. phosphor layer was subjected to a heating treatment at 400° C. Peripheral portions of the support and a protective glass comprised of borosilicate glass were sealed with an adhesive in a dry aerial atmosphere to prepare a radiation image conversion panel sample 1-1 (comparative sample), comprising a phosphor layer with a shielded structure.

Samples 1-2 to 1-6 were prepared similarly to the foregoing sample 1-1, provided that a urea resin was allowed to deposit on the stimulable phosphor layer on the support with heating at a temperature shown in Table 1 to form a protective layer comprised of a urea resin (having a thickness of 10 μm).

Evaluation of Luminance and Luminance Distribution

Samples were each evaluated with respect to luminance, using Regius 350, trade name, produced by Konica Corp. Thus, similarly to the sharpness evaluation described below, radiation image conversion panel samples were each exposed to X-rays of a tungsten bulb at 80 kVp and 10 mAs and at a distance an X-ray source and the sample plate, and thereafter, the sample plate was set on the Regius 350 and read. Evaluation was made from electric signals obtained by a photomultiplier. Luminance as represented by a relative value, based on the luminance of sample 2 being 1.00.

Distribution of electric signals within the exposed panel plate, obtained from the photomultiplier was evaluated. Thus, a standard deviation of the luminance distribution was determined for each panel sample (which was also denoted simply as S.D.). The less value indicates superior homogeneity of an activator.

<Evaluation of Sharpness>

Modulation transfer function (MTF) was determined for each of the radiation image conversion panel samples to evaluate sharpness. Thus, after a CTF chart was adhered to the respective radiation image conversion panels, each of the panels was exposed at 10 mR of 80 kVp X-rays (at a distance to the object: 1.5 m). Thereafter, sample were each scanned with a semiconductor laser light beam (690 nm, a power of 40 mW on the panel) of 100 μm diameter to read it. As shown in Table 1, MTF values (sharpness) of the respective panels were represented by the sum of the MTF values at 2.0 lp/mm.

TABLE 1

| Sample | Protective Layer Resin | Heating Temperature (° C.) | Luminance | MTF (2 lp/mm) | S.D.* | Remark |
|---|---|---|---|---|---|---|
| 1-1 | — | — | 0.12 | 11% | 54 | Comp. |
| 1-2 | urea resin | 140 | 1.12 | 38% | 12 | Inv. |
| 1-3 | urea resin | 160 | 1.53 | 42% | 14 | Inv. |
| 1-4 | urea resin | 180 | 1.42 | 45% | 8 | Inv. |
| 1-5 | urea resin | 200 | 1.38 | 41% | 8 | Inv. |
| 1-6 | urea resin | 250 | 1.36 | 42% | 6 | Inv. |

*luminance distribution

As apparent from Table 1, it was proved that the inventive samples were superior in luminance, luminance distribution and sharpness compared to the comparative sample.

Example 2

Radiation image conversion panel samples 2-2 to 2-6 were prepared similarly to samples 1-2 to 1-6, provided that a urea resin was replaced by a polyimide resin (polymaleimide). The thus prepared samples were each evaluated similarly to Example 1.

TABLE 2

| Sample | Protective Layer Resin | Heating Temperature (° C.) | Luminance | MTF (2 lp/mm) | S.D.* | Remark |
|---|---|---|---|---|---|---|
| 2-2 | PI** resin | 140 | 1.22 | 39% | 8 | Inv. |
| 2-3 | PI resin | 160 | 1.43 | 40% | 12 | Inv. |
| 2-4 | PI resin | 180 | 1.54 | 42% | 6 | Inv. |
| 2-5 | PI resin | 200 | 1.33 | 21% | 4 | Inv. |
| 2-6 | PI resin | 250 | 1.56 | 22% | 3 | Inv. |

*luminance distribution
**polyimide

As apparent from Table 2, it was proved that the* samples resulted in enhanced luminance and sharpness, and even distribution of luminance.

Example 3

Radiation image conversion panel samples 3-2 to 3-6 were prepared similarly to samples 1-2 to 1-6, provided that a protective layer comprised of a urea resin was formed using a polyisocyanate and a polyamine in the following manner. Thus, a polyisocyanate (diphenylmethanediisocyanate) and a polyamine (diphenylmethanediamine) were molded and put into a crucible as an evaporation source, and deposited on the stimulable phosphor layer under conditions, as shown in Table 3 to form a protective layer.

Results are shown in Table 3, in which the residual poyisocyanate content of the protective layer was determined by IR spectrometry.

TABLE 3

| Sample | Ratio (polyisocyanate/polyamine) | Substrate Temperature (° C.) | Polyisocyanate Content*[1] | Luminance | MTF | S.D.** | Remark |
|---|---|---|---|---|---|---|---|
| 3-2 | 1.00 | 50 | none | 1.12 | 38% | 12 | Inv. |
| 3-3 | 0.95 | 30 | none | 1.53 | 42% | 14 | Inv. |
| 3-4 | 0.92 | 30 | none | 1.42 | 45% | 8 | Inv. |
| 3-5 | 0.89 | 30 | none | 1.38 | 41% | 8 | Inv. |
| 3-6 | 0.85 | 30 | none | 1.36 | 42% | 6 | Inv. |

*residual polyisocynate content
**luminance distribution

As apparent from Table 3, it was proved that the samples resulted in enhanced luminance and sharpness, and even distribution of luminance.

What is claimed is:

1. A method of preparing a radiation image conversion panel comprising on a support a stimulable phosphor layer, the method comprising:
   (a) depositing a stimulable phosphor onto the support to form the stimulable phosphor layer comprising columnar crystals of the stimulable phosphor, and:
   (b) forming a protective layer of a thermosetting resin by deposition on the stimulable phosphor layer, wherein the stimulable phosphor layer has a thickness of 50 μm to 1 mm and the protective layer exhibits a reflectance of not more than 20% with respect to stimulated emission and
   wherein the thermosetting resin is comprised of a polyurea.

2. The method of claim 1, wherein in step (b), a protective layer of the polyurea is formed by deposition of a polyisocyanate together with a polyamine on the stimulable phosphor layer.

3. The method of claim 2, wherein a molar ratio of the polyisocyanate to the polyamine is less than 1.0.

4. The method of claim 2, wherein in step (b), the deposition is performed with heating the support at a temperature of at least 50° C.

5. The method of claim 1, wherein the stimulable phosphor is represented by the following formula (1):

$$M^1X \cdot aM^2X' \cdot bM^3X'':eA \qquad \text{formula (1)}$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0<0.5$, $0<0.5$ and $0<e \leqq 0.2$.

6. The method of claim 5, wherein the stimulable phosphor is represented by the following formula (2):

$$M^1X: eA \qquad \text{formula (2)}$$

Wherein $M^1$, X, A and e are each the same as defined in formula (1).

7. The method of claim 6, wherein the stimulable phosphor is CsBr:eEu, wherein e is the same as defined in formula (2).

* * * * *